US008456039B2

(12) United States Patent
Rivera Vasquez et al.

(10) Patent No.: US 8,456,039 B2
(45) Date of Patent: Jun. 4, 2013

(54) R Q 1, A CLOSED CIRCUIT CURRENT SOURCE

(76) Inventors: Juan Ramon Rivera Vasquez, Chicago, IL (US); Musa Yacub Qutub Ansar, Des Plaines, IL (US)

( * ) Notice: Subject to any disclaimer, the term of this patent is extended or adjusted under 35 U.S.C. 154(b) by 971 days.

(21) Appl. No.: 12/287,289

(22) Filed: Oct. 8, 2008

(65) Prior Publication Data

US 2010/0084927 A1 Apr. 8, 2010

(51) Int. Cl.
*H02J 7/00* (2006.01)

(52) U.S. Cl.
USPC .......... 307/150

(58) Field of Classification Search
USPC .......... 307/150
See application file for complete search history.

(56) References Cited

U.S. PATENT DOCUMENTS

| | | | | |
|---|---|---|---|---|
| 5,111,127 | A * | 5/1992 | Johnson | 320/101 |
| 7,352,087 | B2 * | 4/2008 | Nguyen et al. | 307/150 |
| 7,388,348 | B2 * | 6/2008 | Mattichak | 320/101 |
| 7,582,826 | B2 * | 9/2009 | Miller et al. | 136/246 |
| 7,663,342 | B2 * | 2/2010 | Kimball et al. | 320/132 |

* cited by examiner

*Primary Examiner* — Fritz M Fleming

(57) ABSTRACT

The R.Q. 1 is a design for inside and outside areas. It is also a design that can be used as a remote control device. The R Q 1 is a rolling and/or portable dry anaerobic cycle machine that is environmentally friendly and a working prototype model. The system is design for entertainment capabilities with multiple tasks, and standard plug-ins.

3 Claims, 4 Drawing Sheets

R Q 1, A CLOSED CIRCUIT CURRENT SOURCE

The present R Q 1 application claims priority of a file application No. 60/979,442 dated Oct. 12, 2007, the content of which is hereby incorporated by reference into this application.

BACKGROUND OF THE INVENTION

While using a gel battery and a capacitor, the formation of an electric charge for energy storage performs charging and discharging only through the movement when an electronic device is in operational use, and requiring a reaction from the self-excited DC generator. Therefore, the capacitor has the advantages of an excellent output characteristic and able to reduce discharge. Since the capacitor utilizes the natural phenomenon of the formation of electric device structure, it is an advantage for the devices. The capacitor is used in two different ways. In one of the two applications, the capacitor is primarily used alone. In the other, the capacitor is used in conjunction with another type of energy source device such as the D C generator and a solar panel. In either case the battery performs an important function as reusable energy sources. In the recent years the improvements in performance of equipment using the above mentioned energy source and such devices the capacitor, is a remarkable storage device. With the improvements in the performance of equipment there has been a growing demand for reusable and renewable energy resources.

FIELD OF THE INVENTION

The back bone of the invention is to modify the way energy can be reintroduced as a reusable energy source from a DC source which also can be converted to an AC source. While using the source of a standard DC generator, and a gel battery to upload DC current, and enhance the ability to reintroduce alternate current from a self-excited DC generator.

BRIEF SUMMARY OF THE INVENTION

In view of the foregoing disadvantages inherent in the known types, this dry anaerobic cycle machine is to provide a standard usage of devices and/or equipment now present of prior art, that the invention along with modification enhances connections and provides an improvement of an effect of current upload from a standard gel battery able to recharge from a DC generator, and a solar panel charging system while enabling DC current to all electronic devices within figure content. As such, the general purpose of this invention will be described subsequently in greater detail, to provide and advantages of reusable resource.

The R Q 1 is a rolling and/or portable dry anaerobic cycle machine. This dry anaerobic cycle machine that uses a gel battery as the major D.C. current source is the concept of a loop current, or what is call a closed circuit. The word anaerobic is a term that is use in Abiotic; which stand for a nonliving energy system organism where one could see through what is call a Van de Graaff machine along with special goggles that allowed one to see moving electrical particles that move within its own nucleus, or matter thus making contact with a positive and negative electrons or neutrons to produce an electrical charge.

BRIEF DESCRIPTION OF THE DRAWINGS

In the following drawings we intended to be as clear and exact to our best ability in our specifications of this dry anaerobic cycle machine. We have constructed this dry anaerobic cycle machine in such a manner that it can be used in almost any inside dwelling permitting that there is enough room for it, and outside usage. It also can be expanded to various sizes safely with additional future add-ons.

A Legend is been used as reference Figure=Fig, parenthesis, and number order system1,2,3,4,5.

Figure 1:
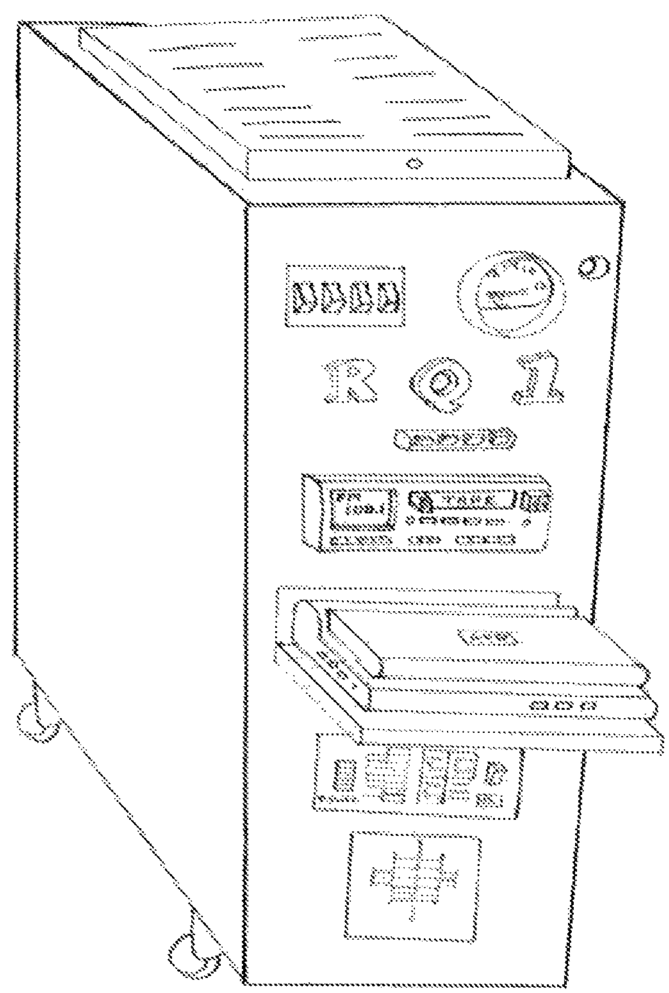

This invention will be better understood and its objects those set forth above it will be more apparent when consideration is given to the following detailed description thereof. Such description makes reference to the connections, cutouts, and views within the drawings wherein:

FIG. 1 shows the perspective front, top, side, and bottom view along with the standard devices, and wood insignia embodiment of the wooden casing that starts outs with its outside view.

Figure 2:
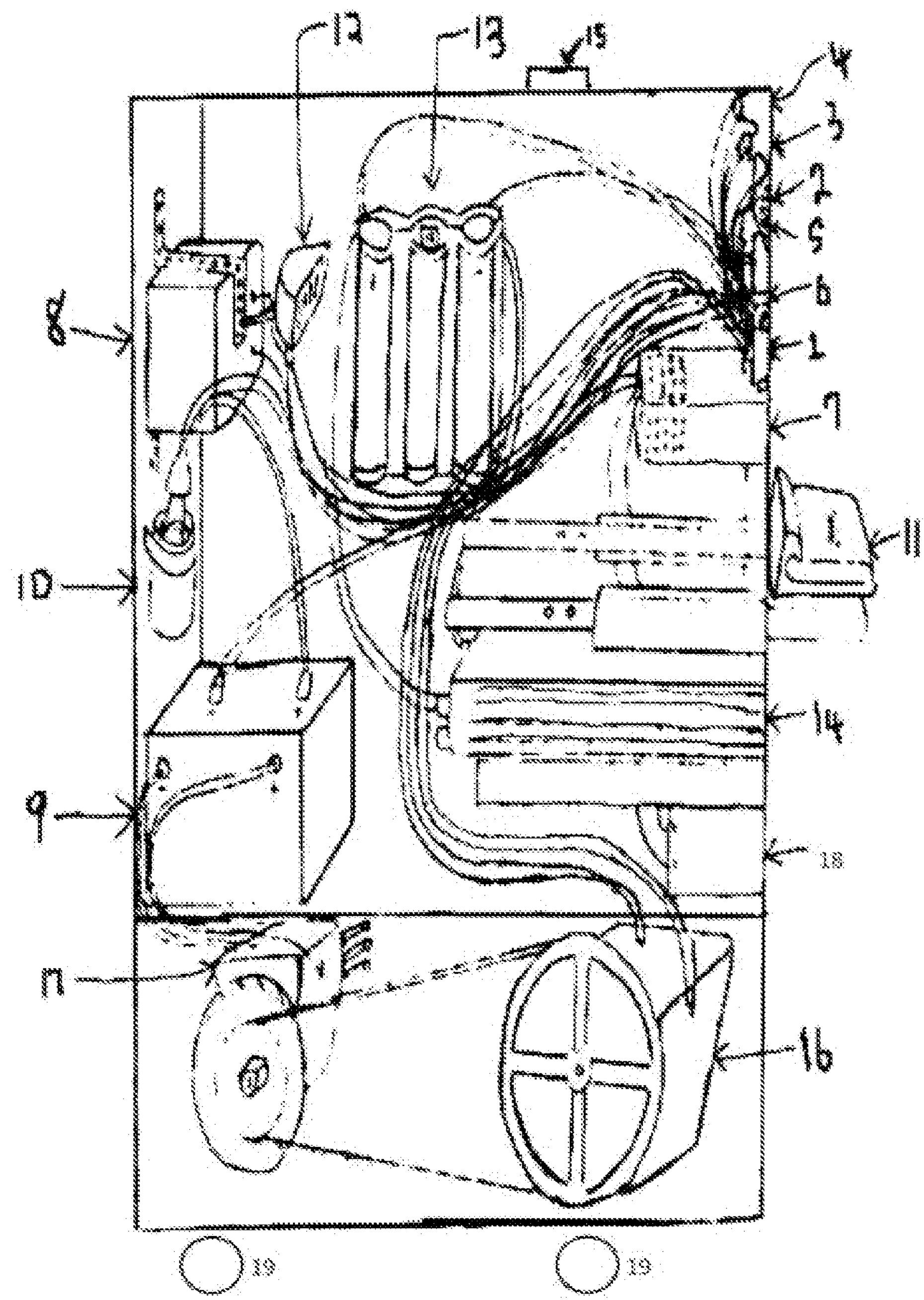
Figure 2:
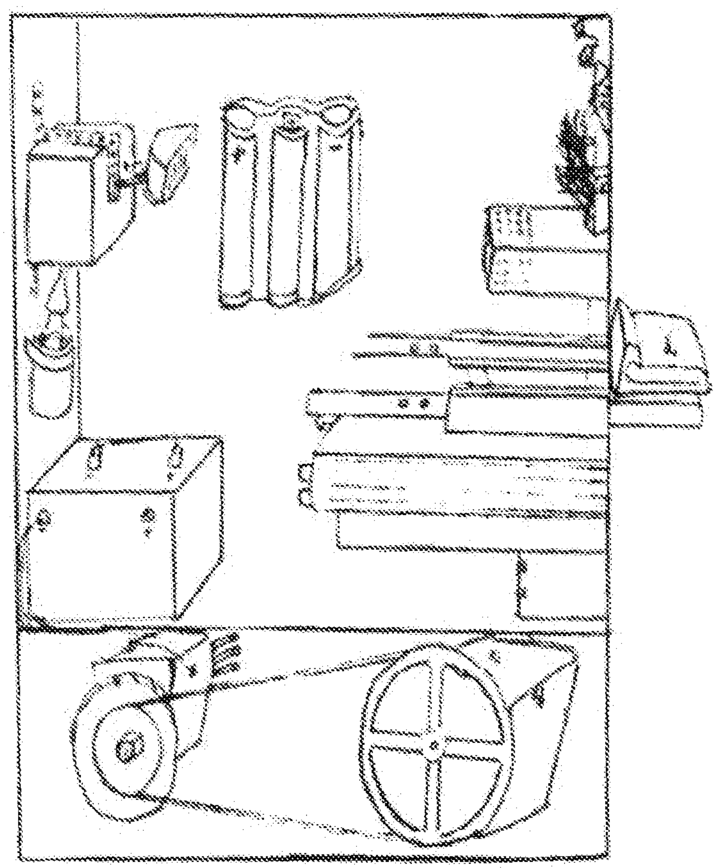

FIG. 2 view the cross section inside casing of the invention and its connections as viewed along the line and set up of FIG. 1.

FIG. 2 A, Shows the view with no wires, and connections just the devices, and equipment setup.

Figure 3:
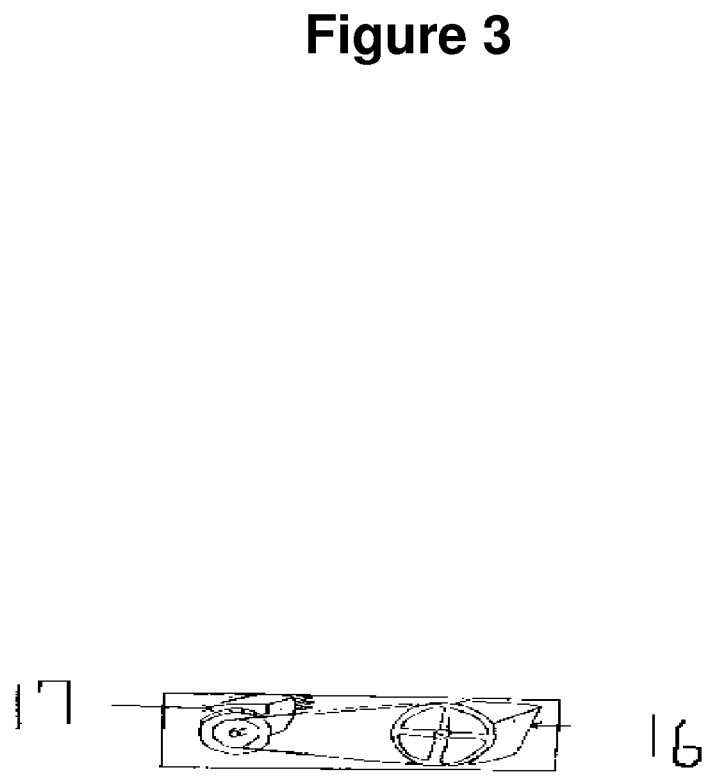

FIG. 3 views of the second inside casing and its connections of the invention viewed along the line within FIG. 2.

DETAILED DESCRIPTION OF THE INVENTION

FIG. 1 shows one wooden casing that starts outs with FIG. 1 which is the outside of the casing, in FIG. 2 we see the inside of the casing and connections, and in FIG. 2 A we see the inside of casing and equipment with no connections. In FIG. 3 the inside casing that houses the motor and a generator which is view in the following drawings. FIG. 1. shows the dimensions of the wooden box that starts out from top which is 24 inches long, 12 inches wide, and ¾ inch deep. The front view board starts out 36 inches long 12 inches wide and ¾ inch deep. In the front view board are the cutouts for all the electronics component devices. That starts out with top front base line that is ½ inch away from top base line. Cutout starts 3 inches wide 2 inches long bottom width is 3½ inch wider for the main switches box. Next is a volt meter cutout is 2 inches away from end of switch box with a 2 inch circle cutout. The universal plug outlet cutout from the volt meter is 1½ inch away and ½ inch away from top base line with a 1¼ inch circle cutout.

The 3 standard letters and number insignia are ¾ inch from bottom base line of the switch board base line and 1¾ inches away from left side base line and 3½ inch away from right side base line. The outside speaker plug is 4 cm from the letter Q and 2 cm from top radio base line and 4½ inches away from left side base line and 5¼ inch away from right side base line. Radio base line is 2½ inches away from left side base line with cutout of 2 inch wide and 7 inch long and 2½ inches away from right side base line. DVD cutout is 1¾ inches away from left side base line cutout starts 2¾ inches long and 8½ inches wide where bottom is wider to accommodate tray table opening and is cutout to 1½ inch away from left side base line with a 1 inch opening for table tray with a wide opening of 10 inches long with the same 1½ inches away from right side base line. The next cutout is the inverter which is 2 inches away from left side base line cutout starts 1½ inch from bottom of DVD opening base line is 3 inches high and 8 inches wide. The last front view cutout is the speaker box which is 2½ inches away from left side base line cutout start with 1 inch from the inverter bottom base line and 4¾ inch high and 7¼ inches wide and 2½ inches away from right base line. Side panel starts outs from front view to right side which is 23½ inches wide 35¾ inches long and ¾ inch deep. Back panel is 3½ ft. long, 12 inches wide and ¾ inch deep cutout starts from 6 inches from top base line 2½ inches from right side base line cutout is 4½ inches long and 7¼ inches wide, and 2 inches away from left side base line. Left door panel is 37 inches long 24 inches wide and ⅛ inch deep. The left door panel also has 3 hinges, and 12 screws holding the door panel in place that provide the opening and closing of door with a stander lock. The bottom board is 24 inches long 12 inches wide and ¾ inch deep. In FIG. 3 the dimension are for both right and left side ends panels 9 inches long by 7½ inches wide and ¾ inch deep. Front view panel is 7½ inches wide and 22½ inches long ½ inch deep. Back panel is 8 inches wide and 22½ inches long and ½ inch deep. Bottom and top panel are 10 inches wide and 22½ long and ½ inch deep. There are two metal strips that are 1 inches wide by 4 inches long along the side of the inside board that mounted on the upper right hand side of the board one is for the positive and the other is for the negative with 8 terminals each. The construction of this wooden box and the inside casing box is constructed of a general hard wood and CDX plywood the wooden box, and casing are attach with a total of 60 drywall screws.

In reference to FIGS. 1, 2, 2 A, and 3 all components, and connections for each components are shown. Shown is the use of four standard color coded separated lighted switches starting out with green, blue, yellow, and red, with each positive and negative connection terminals for individual connections. The first switch is green to turn on and off power for the motor and the DC and AC generator. The second switch is blue for an inside light. The third switch is yellow for a standard universal DC plug outlet, and the last switch is red for the volt meter indicator. It starts out in the following order (1) Two standard metal strips terminals that are mounted to the wooden inside frame one is for a positive D.C. current flow, and the other is a negative ground. (2) A standard switch box with 4 separated color coded lighted switches for On and Off power. (3) A standard volt meter for indication of volts with the positive and negative leads that are connected to the positive and negative metal strips terminals that connects to the number two blue switch for On and Off power. (4) A standard universal D C plug outlet with a positive and negative leads that is connected to the positive and negative leads of the metal strips terminals that is connected to the forth red switch for On and Off power. (5) Below the switch box, volt indicator, and the D.C. plug outlet is the use of 3 standard wood insignia with combinations of letters and number which are nail threw the center of each which are used as abbreviation for "R Q 1" which are hand painted in black and blue. (6) Below the insignia is one standard outside front speakers plug outlet with a positive and negative terminals, and leads that are connected to the radio positive and negative leads of the Front Right and Left Right speaker setup. (7) Below the speaker outlet is one standard car radio AM/FM stereo cassette player; the radio positive and negative leads are connected to the positive and negative metal strips terminals for power. There is also a 4 speaker wire set that indicate Front Left, Front Right, Rear Right, and Rear Left setup. (8) Shows two standard speaker boxes for connections of the radio wire set each are 7 inches long 4 inches wide and 4 inch deep with each separate positive and negative speaker leads. One of the speakers is mounted on the inside back wall, and the other is below the inverter and they are connected to the AM/FM radio Rear Right and Rear Left speaker wire set. In reference to FIGS. 2, and 2A (9) Show the use of one standard 12 volts gel battery with positive and negative top post, and bottom terminals which is used for current upload. (10) Show the use of one standard car ignition coil with positive and negative terminals, the connections are as follow there is one wire connected from the battery positive top post to the secondary winding lead of the coil. From the secondary winding lead there is another wire that is connected to the positive metal strip terminals. In the primary terminals of the coil there is a wire connected from the positive terminal to the negative terminal thus allowing an increases of current to the secondary winding and creating a booster current to the positive metal strip terminal for all output power. (11) Show the use of one standard portable DVD player that is connected to the inverter plug in, it also has an additional D C adapter that can be connect to the universal D C plug outlet. (12) Show the use of one standard inside light mounted on top of the speaker casing of the back wall with its positive and negative leads that is connected to the positive and negative yellow switch terminals that is also connected to the metal strips positive and negative terminals. (13) Show the use of one standard universal capacitor 5000 μF. with a positive and negative inputs and output. Where the input positive and negative of the capacitor is connected to the positive and negative of the metal strips terminals for input power. From the output of the capacitor there are two separate positive and negative leads that are connected to the inputs positive and negative leads of the standard inverters for power. In reference to FIGS. 1, 2, and 2A, (14) Show the use of one standard universal inverter with its own On and Off power switch and 3 outlet plugs for plug in, that is connected from the capacitor output to the inverter input for power. In reference to FIGS. 1, and 2 (15) Show the use of one standard universal solar panel which is on top of box with a ⅛ inch pin hole with a separate positive and negative leads and a digital controller that manage the power source that is connect to the inputs and output leads that is connected to the 12 volts gel batteries bottom terminals for additional back up charging. In reference to FIG. 3, (16) Show the use of one standard D C motor with positive and negative leads connected to the positive and negative metal strips terminals which is also connected to the first main green lighted switch for On and Off power. A use of one standard 10 inch pulley driving by a 19 inch belt turning a 3 inch pulley attach to the D C generator. (17) Show the use of one standard DC generator modified with positive and negative leads coming out from a ⅛ pin hole for a D C and AC current conversion with a positive and negative terminals, along with a 3 inch standard pulley able to self-excite at or around 400 rpm thus creating a general charging system for the battery. The output positive and negative connections from the generator are connected to the bottom positive and negative terminals of the battery which provide the main current upload to the battery from D C the generator. In reference to FIGS. 1, 2, 2 A, and 3 (18) Also has additional space for future electronics devices, and future add-ons. FIG. 1. (19) Use of 4 standard caster wheels of 2½/inches tall for easy move around attach to the bottom of the wooden box.

With reference now to the drawings and in particular to FIGS. 1, 2, 2 A, and 3 thereof, this new dry anaerobic cycle machine embodying the principles set up and concepts of the invention and generally designated by the reference of the figures, parenthesis, and number system that will be described more specifically in this noted that is divided into cross sections. This dry anaerobic cycle machine is intended to cover the individual standard devices, equipment, and connections by utilizing the views of connections for each set device. To obtain the variations of the construction, and its connections with particular reference thereof.

FIG. 1 of the drawings provides a CDX material that is described in the specification section along with its dimension which also shows the outside view of the embodiment.

When activated, the four separated lighted switches is for the individual connections for On and Off power, along with the view shows the top solar panel, outside volt meter, DC universal plug outlet, speaker plug outlet, radio, DVD player, inverter, and bottom speaker it also has additional space for future add-ons, also this dry anaerobic cycle machine could be remote control. Also there are 4 standard caster wheels for easy move around.

FIG. 2 shows the inside of the casing and its cross sectional views of the devices, equipment, connections, and number system that shows the interface of the system, that starts out with the uses of two standard speakers boxes one of the speakers is mounted on the inside back wall, and the other is below the inverter. They are connected to the radio, and there is also a standard 12 volts gel battery with positive and negative top posts, and bottom terminals which is used for current upload, and to the standard universal capacitor also has a positive and negative inputs and output, the capacitor is connected to the positive and negative of the metal strips terminals for input power, a standard ignition coil with positive and negative terminals, a standard inside light mounted on top of the speaker casing of the back wall connected to the third lighted switch. FIG. 2 A shows the view with no wires, and connections just the devices, and equipment setup. FIG. 3 shows the lower inside casing that is for a motor and a generator that is view along within FIGS. 2, and 2A as described the use of one standard DC motor connected to the positive and negative metal strips terminals, and also connected to the first main power lighted switch for On and Off power. When turn On, a standard DC generator modify with a positive and negative wire leads DC and AC current conversion with a positive and negative terminals able to self-excite thus creating a general charging system for the battery.

We claim the following distinctive wire setup, and connections of the following standard devices, and/or equipment used within the following drawings figures, order number system, and text content:

1. A dry anaerobic cycle machine system comprising a 12 volts gel battery with positive and negative top posts, and bottom positive and negative terminals that provides a D C current upload to electronic devices, as well to a capacitor along with a standard ignition coil that enhance a boosted output power for the system in comprising, a first switch directly connected to positive and negative leads of a motor, and to positive and negative metal strips terminals for On and Off power, a second switch that turns On and Off power for a volt meter indicator that is connected to the positive and negative terminals of the second switch and also connected to the positive and negative metal strips terminals for On and Off power, a third switch that turns On and Off power for an inside light which its leads are connected to the positive and negative terminals of the third switch and also connected to the positive and negative metal strip terminals for On and Off power, a fourth switch that turns On and Off power to a universal D C plug outlet that is connected to the positive and negative terminals of the fourth switch and also connected to the positive and negative leads of the metal strip terminals for On and Off power, and current upload comprising a front speakers plug outlet that also shows the positive and negative outside connections for additional outside speaker connections while the inside of the speaker plug outlet is connected to inside radio wire leads of Front Right and Front Left speaker wire leads setup, a car radio AM/FM stereo cassette player with positive and negative leads that are connected to the positive and negative leads of the metal strips terminals which allows power to the car radio, and a speakers wire leads set that indicate Front Left, Front Right, Rear Right, and Rear Left setup, with a bottom inside speaker that is connected to the Rear Right leads, and the top inside speaker that is connected to the Rear Left leads of the speakers wire leads sets.

2. The system as described in claim 1 further comprising a standard capacitor with input leads that are connected to the positive and negative leads of the metal strips terminals while outputs leads from the capacitor are connected to the input positive and negative leads of an inverter which has 3 AC plugs and its own On and Off switch for power further comprising the connection of the ignition coil is from the top positive post of the battery which is connected to a top post of the ignition coil which is called a secondary winding, from the secondary winding another lead is connected directly to the positive metal strip from the lower top of the secondary winding and one positive and one negative terminal on the ignition coil where a grounded wire is, and one lead that is connected from the positive to the negative terminal on the top of the ignition coil thus allowing an Increase of voltage for output power which is directed to the positive metal strip lead.

3. The system of claim 2 further comprising the bottom battery positive and negative terminals connected to a DC generator which is used as a main charging system along with a solar panel as a separate charging system, further comprising DC generator positive and negative leads that are coming out from the back of the DC generator which are connected to the positive and negative bottom terminals of the battery, also the D C generator has three separate leads, one positive, neutral, and a negative, the neutral allows the conversion from DC to AC power, the solar panel positive and negative leads are directly connected to a charge controller, and also connected to the battery bottom terminals.

* * * * *